Patented Feb. 15, 1938

2,108,763

UNITED STATES PATENT OFFICE 2,108,763

PROCESS FOR CLEANING FRUITS AND VEGETABLES

Thomas S. Carswell, Kirkwood, Mo., assignor, by mesne assignments, to Monsanto Chemical Company, St. Louis, Mo., a corporation of Delaware No Drawing. Application February 17, 1934, Serial No. 711,819

18 Claims. (Cl. 99—103)

The present invention relates to the cleaning of fruits and vegetables. More particularly this invention relates to the removal of spray residues from fruits and vegetables.

In the combating of insect pests, as for example the codling moth, which are detrimental to plant life, it has become customary to employ spray insecticides, as for example lead arsenate sprays. The employment of such sprays has been found to be efficient in combating the insect pests, but such sprays possess the decided disadvantage of remaining on the surface of the mature fruit and vegetable after they have been picked or harvested and are ready for market. The accumulation of the spray residue on the surface of the fruit or vegetable is accentuated by the use of agents to facilitate the adhering of the insecticide thereto. As examples of such adhering agents are oils and casein. The washing of the treated fruit or vegetable is thus rendered necessary to remove the accumulation of poisons resulting from the treatment with such insecticidal sprays as for example arsenate of lead, arsenate of calcium, Bordeaux mixture, lime-sulfur and the like.

According to the present invention it has been found that such spray residues are conveniently removed from the surface of fruits and vegetables by washing with a weak acid solution containing a small proportion of a product obtainable by treating with sulfuric acid a reaction product of an alcohol and a non-condensed aromatic compound. By the term non-condensed aromatic compound is meant an aromatic compound the nuclear carbon atoms of which are part of a single ring only.

As examples of the fruits that may be so washed are apples, pears, plums, peaches, prunes, cherries, grapes, lemons, oranges, and the like. As examples of the vegetables that may be so washed are beans, celery, peas and the like, greens such as spinach, chard and the like.

As examples of the preferred class of compounds which may be employed preferably in an acid solution in the washing of fruits and vegetables are the following materials which may be conveniently prepared in a manner analogous to that set forth in U. S. Patent 1,921,546 granted to Robert L. Sibley, August 8, 1933; the sodium salt of the sulfuric acid derivative of the reaction product of diphenyl and normal butyl alcohol, the sodium salt of the sulfuric acid derivative of the reaction product of ortho hydroxy diphenyl and normal butyl alcohol, the sodium salt of the sulfuric acid derivative of the reaction product of normal butyl alcohol and a mixture of ortho and para hydroxy diphenyl, the sodium salt of the sulfuric acid derivative of the reaction product of phenol and normal amyl alcohol, the potassium salt of the sulfuric acid derivative of the reaction product of ortho cresol and normal butyl alcohol, the sodium salt of the sulfuric acid derivative of the reaction product of para hydroxy diphenyl and normal butyl alcohol, the potassium and ammonium salts of the sulfuric acid derivatives of the reaction products of ortho hydroxy diphenyl and iso butyl alcohol, octyl alcohol, cetyl alcohol, cyclohexanol and benzyl alcohol respectively.

The following example is to be understood as a specific embodiment of the present invention, and not a limitation of the scope thereof.

To a 1.75% hydrochloric acid solution there was added 0.5% of the weight thereof of the sodium salt of the sulfuric acid derivative of the reaction product of ortho hydroxy diphenyl and normal butyl alcohol, prepared substantially as set forth in U. S. Patent 1,921,546. The solution prepared as described was conducted to a suitable washer and apples placed therein, which had been sprayed with a lead arsenate spray and contained 0.097 grains of $As_2O_3$ and 0.277 grains of lead respectively per pound of fruit. After allowing the apples to remain in the washing solution for substantially 1.5 minutes at a temperature of substantially 100° F., and further washing with water, the apples contained only 0.004 grains of $As_2O_3$ and 0.024 grains of lead respectively per pound of apples.

It is thus readily shown that the preferred process comprises a very desirable means of cleaning fruit and vegetables. Other concentrations of hydrochloric acid than that set forth above have been employed, thus a 0.66% hydrochloric acid solution has been so employed. Furthermore, other temperatures and periods of time for the washing operation may be conveniently employed. The preferred class of compounds has also been used in one percent nitric acid and acetic acid solutions respectively as a washing medium for fruit.

The preferred class of materials also functions advantageously in the removal of undesirable wax present on the fruit at the time of washing.

By the term alkali metal as appearing in the following claims is meant members of the alkali metal series and the ammonium ($NH_4$) radical.

The present invention is limited solely by the claims attached hereto as a part of this specification.

What is claimed is:

1. A process for the removal of spray residues from fruit and vegetables comprising the application thereto of a dilute aqueous solution of an inorganic acid containing a small proportion of an alkali metal salt of a compound obtainable by reacting sulfuric acid with the reaction product of an aliphatic alcohol and a diphenyl compound.

2. A process for the removal of spray residues from fruit and vegetables comprising the application thereto of a dilute aqueous solution of an inorganic acid containing a small proportion of an alkali metal salt of a compound obtainable by reacting sulfuric acid with the reaction product of an aliphatic alcohol and diphenyl.

3. A process for the removal of spray residues from fruit and vegetables comprising the application thereto of a dilute aqueous solution of an inorganic acid containing a small proportion of an alkali metal salt of a compound obtainable by reacting sulfuric acid with the reaction product of an aliphatic alcohol and a hydroxy substituted diphenyl.

4. A process for the removal of spray residues from fruit and vegetables comprising the application thereto of a dilute aqueous solution of hydrochloric acid containing a small proportion of the sodium salt of a compound obtainable by reacting sulfuric acid with the reaction product of normal butyl alcohol and ortho hydroxy diphenyl.

5. A process for the removal of spray residues from fruit and vegetables comprising the application thereto of a dilute aqueous solution of hydrochloric acid containing a small proportion of the sodium salt of a compound obtainable by reacting sulfuric acid with the reaction product of normal butyl alcohol and para hydroxy diphenyl.

6. A process for the removal of spray residues from fruit and vegetables comprising the application thereto of a dilute aqueous solution of hydrochloric acid containing a small proportion of a compound obtainable by reacting sulfuric acid with the reaction product of normal butyl alcohol and diphenyl.

7. An improved washing solution for fruit and vegetables comprising a dilute aqueous solution of an inorganic acid containing a small proportion of an alkali metal salt of a compound obtainable by reacting sulfuric acid with the reaction product of an aliphatic alcohol and a diphenyl compound.

8. An improved washing solution for fruit and vegetables comprising a dilute aqueous solution of an inorganic acid containing a small proportion of an alkali metal salt of a compound obtainable by reacting sulfuric acid with the reaction product of an aliphatic alcohol and diphenyl.

9. An improved washing solution for fruit and vegetables comprising a dilute aqueous solution of an inorganic acid containing a small proportion of an alkali metal salt of a compound obtainable by reacting sulfuric acid with the reaction product of an aliphatic alcohol and a hydroxy substituted diphenyl.

10. An improved washing solution for fruit and vegetables comprising a dilute aqueous solution of hydrochloric acid containing a small proportion of the sodium salt of a compound obtainable by reacting sulfuric acid with the reaction product of normal butyl alcohol and ortho hydroxy diphenyl.

11. An improved washing solution for fruit and vegetables comprising a dilute aqueous solution of hydrochloric acid containing a small proportion of the sodium salt of a compound obtainable by reacting sulfuric acid with the reaction product of normal butyl alcohol and para hydroxy diphenyl.

12. An improved washing solution for fruit and vegetables comprising a dilute aqueous solution of hydrochloric acid containing a small proportion of a compound obtainable by reacting sulfuric acid with the reaction product of normal butyl alcohol and diphenyl.

13. A process for the removal of spray residues from fruits and vegetables comprising the application thereto of a dilute aqueous solution of a strong inorganic acid which forms water-soluble calcium and lead salts, containing a small proportion of an alkali metal salt of a compound obtainable by reacting sulfuric acid with the reaction product of an aliphatic alcohol and a diphenyl compound.

14. A process for the removal of spray residues from fruits and vegetables comprising the application thereto of a dilute aqueous solution of a strong inorganic acid which forms water-soluble calcium and lead salts, containing a small proportion of an alkali metal salt of a compound obtainable by reacting sulfuric acid with the reaction product of an aliphatic alcohol and diphenyl.

15. A process for the removal of spray residues from fruits and vegetables comprising the application thereto of a dilute aqueous solution of a strong inorganic acid which forms water-soluble calcium and lead salts, containing a small proportion of an alkali metal salt of a compound obtainable by reacting sulfuric acid with the reaction product of an aliphatic alcohol and a hydroxy substituted diphenyl.

16. A process for the removal of spray residues from fruits and vegetables comprising the application thereto, in the absence of an organic solvent, of a dilute aqueous solution of a strong inorganic acid which forms water-soluble calcium and lead salts, containing a small proportion of an alkali metal salt of a compound obtainable by reacting sulfuric acid with the reaction product of an aliphatic alcohol and a diphenyl compound.

17. A process for the removal of spray residues from fruit and vegetables comprising the application thereto of a dilute aqueous solution of an acid containing a small proportion of a water soluble salt of a sulfonated and alkylated aromatic hydrocarbon, the nuclear carbon atoms of which are part of a single ring only, said nuclear carbon atoms being more than five and less than thirteen in number.

18. A process for the removal of spray residues from fruit and vegetables comprising the application thereto of a dilute aqueous solution of an acid containing a small proportion of a water soluble salt of a sulfonated and alkylated diphenyl compound.

THOMAS S. CARSWELL.